Nov. 3, 1942.　　　　　L. YOST　　　　　2,301,105
SAFETY COLLAR FOR DRILLS
Filed May 1, 1941
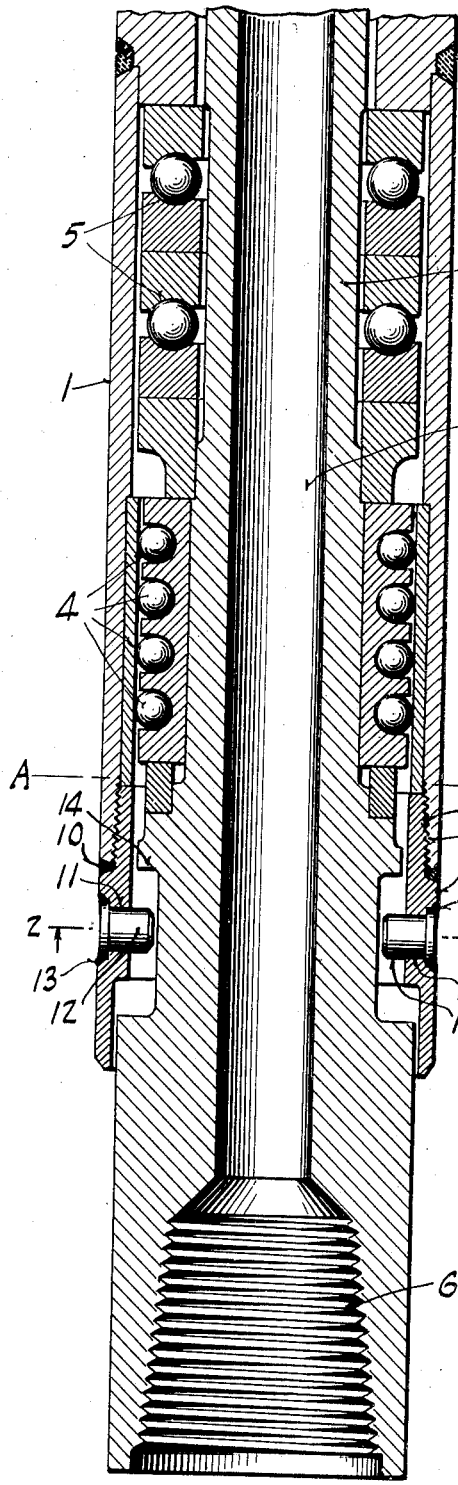
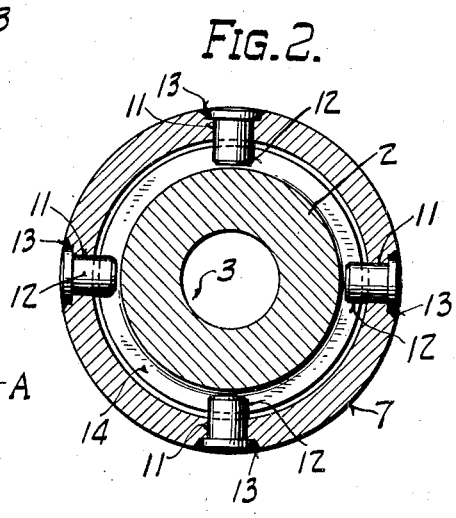
Lloyd Yost
INVENTOR.
BY
ATTORNEY.

Patented Nov. 3, 1942

2,301,105

UNITED STATES PATENT OFFICE 2,301,105

SAFETY COLLAR FOR DRILLS

Lloyd Yost, Los Angeles, Calif., assignor to A. O. Smith Corporation, Milwaukee, Wis., a corporation of New York Application May 1, 1941, Serial No. 391,334

2 Claims. (Cl. 255—4)

This invention relates to well drilling equipment in which a rotary drill bit is turned by a multiple stage, axial flow hydraulic turbine positioned near the bit and driven by drilling mud pumped down to it through a hollow drill stem.

An object of the invention is to provide a safety collar for retaining the bit in case the shaft to which it is attached should break during operation of the unit.

This and other objects of the invention will be clear from the following detailed description and the accompanying drawing in which:

Figure 1 is a longitudinal vertical section through the lower portion of a turbine drilling unit constructed in accordance with this invention; and Fig. 2 is a transverse section taken on the line 2—2 of Figure 1 looking in the direction of the arrows.

The drilling unit comprises an outer casing 1 which houses a multiple stage, axial flow hydraulic turbine. The turbine is driven by the drilling mud pumped down to it through the drill stem and rotates a hollow shaft 2 with central passageway 3 into which the mud is directed after passing through the turbine. The details of the turbine construction and of the means used to direct mud into the passageway through the hollow shaft form no part of this invention and are accordingly, not shown in the drawing.

The shaft 2 is supported in casing 1 by means of radial bearings 4, thrust bearing 5, and preferably an additional set of radial bearings not shown in the drawing. The shaft terminates, at its lower end, in an internally threaded socket 6 for attachment to a drill bit or to a connector between the shaft and bit.

The shaft 2, as well as the other parts of the drilling unit, are subjected to severe stresses during operation. As a consequence of fatigue or other causes, the shaft may snap in two. It has been found that when such fractures of the shaft occur, they are above a line A—A of Fig. 1, and never below it.

To prevent loss of the drill bit should the shaft break, and the consequent need of fishing for the bit after the drill stem and drilling unit have been removed from the well, a retaining collar 7 is provided which has screw threads 8 for connection to threads 9 at the lower end of casing 1.

After the screw joint is made, the parts may be additionally secured by weld 10 to prevent unscrewing which may occur because of the shocks and jars to which the unit is subjected during use.

The retaining collar is provided with a number of holes 11 for the reception of pins 12. The pins are inserted after the shaft has been assembled in place and may be held by tack welds 13 to insure against loss. In case the shaft should break at any time, the lower portion simply drops down a short distance until the flange or shoulder 14 on the shaft rests on pins 12. The lower part of the shaft and the drill bit are consequently secured against loss and are removed with the rest of the unit when this is taken from the well.

I claim:

1. In a turbine driven well drilling unit, a vertically disposed turbine having a rotary shaft extending downwardly therefrom to carry the drilling tool, a housing for said turbine and containing the main bearings for said shaft at the lower end of the turbine, a circumferential shoulder facing downwardly on said shaft below said bearings, the smallest cross section of said shaft below the bearings being above said shoulder and constituting the weakest section of the shaft, and in inward projection on said housing disposed beneath said shoulder to prevent longitudinal separation of the shaft and housing in the event that the shaft breaks above the shoulder.

2. In a turbine driven well drilling unit, a vertically disposed turbine having a rotary shaft extending downwardly therefrom to carry the drilling tool, a housing for said turbine and containing the main bearings for said shaft at the lower end of the turbine, a circumferential shoulder facing downwardly on said shaft below said bearings, the smallest cross section of said shaft below the bearings being above said shoulder and constituting the weakest section of the shaft, a removable extension member secured to the end of the housing and extending below said shoulder on said shaft, and a projection extending inwardly from said member beneath said shoulder to prevent longitudinal separation of the shaft and casing in the event that the shaft breaks above the shoulder.

LLOYD YOST.